H. BUTNER.
COMBINED HARROW AND CULTIVATOR.
No. 177,685. Patented May 23, 1876.
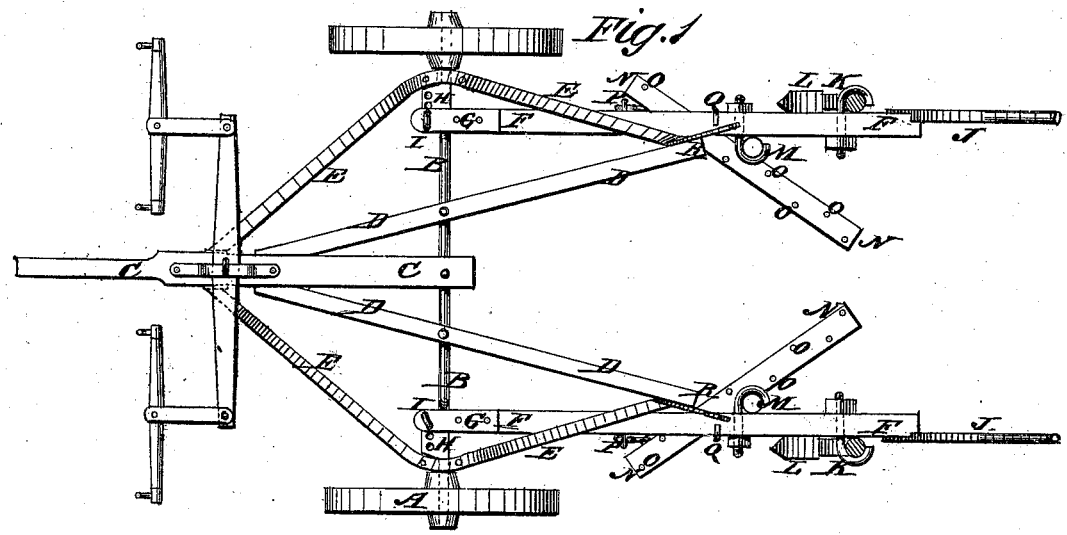
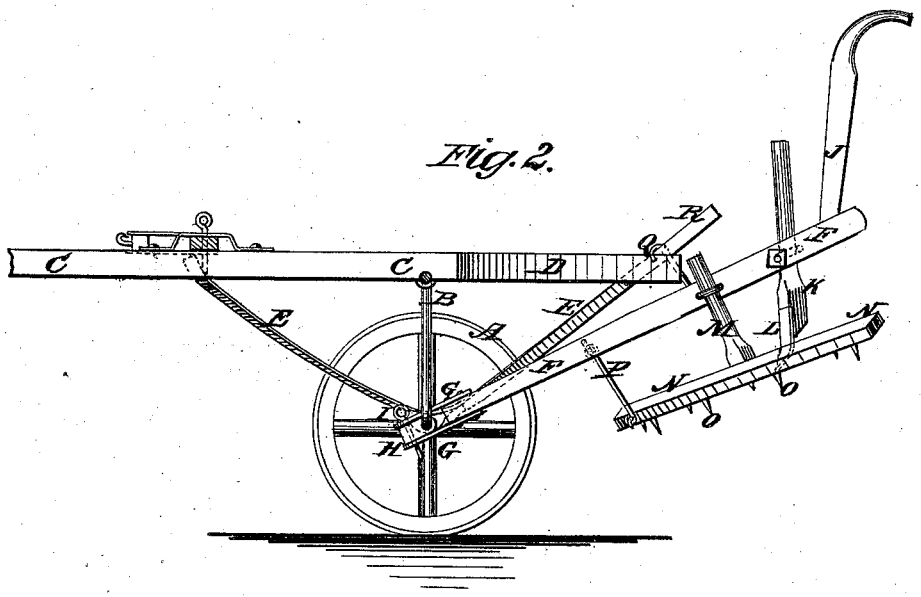
WITNESSES:
Francis McArdle
John Goethals
INVENTOR:
H. Butner
BY
Munn
ATTORNEYS.

UNITED STATES PATENT OFFICE.

HARLIN BUTNER, OF DUNCAN'S BRIDGE, MISSOURI.

IMPROVEMENT IN COMBINED HARROWS AND CULTIVATORS.

Specification forming part of Letters Patent No. 177,685, dated May 23, 1876; application filed March 13, 1876.

*To all whom it may concern:*

Be it known that I, HARLIN BUTNER, of Duncan's Bridge, in the county of Monroe and State of Missouri, have invented a new and useful Improvement in Combined Harrow and Cultivator, of which the following is a specification:

Figure 1 is a top view of my improved device, shown as applied to a cultivator. Fig. 2 is a side view of the same.

Similar letters of reference indicate corresponding parts.

The object of this invention is to furnish an improved machine for cultivating corn and other crops planted in rows or drills, which shall be so constructed as to thoroughly loosen and pulverize the soil and destroy the grass and weeds, and at the same time open a furrow between the rows to drain off water.

The invention will first be fully described, and then pointed out in the claim.

A are the wheels, which revolve upon the journals of the axle B. The axle B is bent four times at right angles, to raise its middle part to pass over the plants without injuring them. To the middle part of the axle B is attached the tongue C and the hounds D, that strengthen the said tongue against side strain. The rear ends of the hounds D project, and to them are attached the rear ends of the braces E. The middle parts of the braces E are attached to the end parts of the axle B at the inner sides of the wheels A, and their forward ends are attached to the tongue C. F are the plow-beams, to the upper and lower sides of the forward ends of which are attached straps G, which project to receive the blocks H, through which the end parts of the axle B pass. The blocks H have several holes formed through them to receive the pin I, which also passes through holes in the forward ends of the straps G, so that the plows may be adjusted wider apart and closer together, and so that the rear ends of the plow-beams may have a lateral and vertical movement. To the rear ends of the beams F are attached the handles J, by which they are guided, and the standards K, to the lower ends of which the cultivator-plows L are attached. To the sides of the plow-beams F, in front of the standards K, are attached, by hook-bolts or other conveniently-adjusted fastening, standards M, to the lower ends of which are rigidly attached cross-bars N, which are provided with harrow-teeth O. The draft-strain upon the harrows M N O is sustained, and the bars N are held at the proper inclination, by brace-rods P, the rear ends of which are pivoted to the forward ends of the said bar N, and their forward ends are attached to the sides of the beams F. By this construction the harrows M N O will loosen up and pulverize the soil, and destroy the weeds and grass between the rows of plants, and the plows K L will open a furrow to drain off the water. The harrows M N O may be used without the plows K L, if desired. To the beams F are attached hooks Q to hook upon arms R, attached to the rear ends of the hounds D, and which may be the projecting ends of the braces E.

Having thus described my invention, I claim as new and desire to secure by Letters Patent—

The combination of the plows K L and harrows M N O, relatively arranged substantially as and for the purpose specified.

his
    HARLIN × BUTNER.
        mark.

Witnesses:
 J. F. WOODS,
 MONROE MILLION,
 JOHN C. RODES.